(12) United States Patent
Goodsell et al.

(10) Patent No.: US 11,781,497 B1
(45) Date of Patent: Oct. 10, 2023

(54) DIESEL PARTICULATE FILTER (DPF) BACKPRESSURE SENSOR AS ALTITUDE SENSOR

(71) Applicant: THERMO KING LLC, Minneapolis, MN (US)

(72) Inventors: James Goodsell, Lakeville, MN (US); Adam B Carey, Cottage Grove, MN (US)

(73) Assignee: Thermo King LLC, Minneapolis, MN (US)

( * ) Notice: Subject to any disclaimer, the term of this patent is extended or adjusted under 35 U.S.C. 154(b) by 0 days.

(21) Appl. No.: 17/834,308

(22) Filed: Jun. 7, 2022

(51) Int. Cl.
| | |
|---|---|
| *F02D 35/00* | (2006.01) |
| *F01N 3/02* | (2006.01) |
| *F01N 3/023* | (2006.01) |
| *F01N 9/00* | (2006.01) |

(52) U.S. Cl.
CPC ......... *F02D 35/0015* (2013.01); *F01N 3/023* (2013.01); *F01N 9/002* (2013.01)

(58) Field of Classification Search
CPC ........ F02D 35/00; F02D 35/0015; F01N 3/02; F01N 3/023; F01N 3/0256; F01N 3/106; F01N 9/00; F01N 9/002; F01N 2560/14
See application file for complete search history.

(56) References Cited

U.S. PATENT DOCUMENTS

| | | | | |
|---|---|---|---|---|
| 6,158,403 | A * | 12/2000 | Berecewicz | F01L 9/20 123/90.11 |
| 8,407,989 | B2 | 4/2013 | Leustek et al. | |
| 8,631,643 | B2 | 1/2014 | Farman et al. | |
| 8,776,501 | B2 | 7/2014 | Carlill et al. | |
| 9,062,633 | B2 | 6/2015 | Moravec et al. | |
| 9,371,754 | B2 | 6/2016 | Bloms et al. | |
| 10,210,673 | B2 | 2/2019 | Dudar | |
| 11,300,060 | B1 * | 4/2022 | Dudar | F02D 41/0087 |
| 11,448,108 | B1 * | 9/2022 | Dudar | F01N 3/22 |
| 2007/0277509 | A1 | 12/2007 | Tahara et al. | |

FOREIGN PATENT DOCUMENTS

CN 112282906 12/2021

* cited by examiner

*Primary Examiner* — John Kwon
*Assistant Examiner* — Johnny H Hoang
(74) *Attorney, Agent, or Firm* — Hamre, Schumann, Mueller & Larson, P.C.

(57) ABSTRACT

A transport power system is provided. The transport power system includes a prime mover separate from another prime mover used for operating a vehicle, an absolute pressure sensor configured to sense an absolute pressure, and a controller. The controller is configured to determine an altitude of the transport power system based on a first absolute pressure sensed during a start-up sequence of the transport power system prior to running of the prime mover, adjust a power output upper limit for the prime mover based on the determined altitude, and control an operation of the prime mover of the transport power system not to exceed the adjusted power output upper limit.

16 Claims, 5 Drawing Sheets

DIESEL PARTICULATE FILTER (DPF) BACKPRESSURE SENSOR AS ALTITUDE SENSOR

FIELD

This disclosure relates generally to adjusting a power output upper limit for a prime mover of a transport power system. More specifically, the disclosure relates to systems and methods for adjusting a power output upper limit for a prime mover of a transport power system that can be used, for example, for powering a transport climate control system (TCCS) and having an altitude sensor and/or configuring a diesel particulate filter (DPF) backpressure sensor as an altitude sensor.

BACKGROUND

A transport climate control system (TCCS) can include, for example, a transport refrigeration system (TRS) and/or a heating, ventilation and air conditioning (HVAC) system. A TRS is generally used to control an environmental condition (e.g., temperature, humidity, air quality, and the like) within a cargo space of a transport unit (e.g., a truck, a container (such as a container on a flat car, an intermodal container, etc.), a box car, a semi-tractor, a passenger bus, or other similar transport unit). The TRS can maintain environmental condition(s) of the cargo space to maintain cargo (e.g., produce, frozen foods, pharmaceuticals, etc.). In some embodiments, the transport unit can include a HVAC system to control a climate within a passenger space of the vehicle.

SUMMARY

This disclosure relates generally to adjusting a power output upper limit for a prime mover of a transport power system. More specifically, the disclosure relates to systems and methods for adjusting a power output upper limit for a prime mover of a transport power system that can be used, for example, for powering a TCCS and having an altitude sensor and/or configuring a DPF backpressure sensor as an altitude sensor.

Embodiments disclosed herein can use a single absolute pressure sensor (instead of a gauge pressure sensor) as a DPF backpressure sensor (which can be used or operated when the prime mover is running to determine particulate matter and/or soot accumulation, i.e., to determine how full the DPF is), and as a sensor to deduce the altitude of the transport power system (when the prime mover is not running). Embodiments disclosed herein can provide a controller to adjust a power usage/limit of the prime mover based on the altitude, and to vary the DPF fill level as a function of altitude.

Embodiments disclosed herein can also use an absolute pressure sensor to deduce the altitude of the transport power system so that a controller can adjust the power usage/limit of the prime mover based on the altitude of the transport power system.

It will be appreciated that in some embodiments the prime mover (e.g., a diesel engine, a mechanical engine and/or hybrid engine, or the like), is not solely an electronic engine. Also, the prime mover may not be the prime mover used for operating the vehicle. That is, the prime mover disclosed herein can be separate from and/or independent to the prime mover used for operating the vehicle. In some applications, when the prime mover used for operating the vehicle is running, the prime mover (e.g., a diesel engine of the transport power system, or the like) disclosed herein typically can be off, and vice versa.

In an embodiment, a transport power system is provided. The transport power system includes a prime mover separate from another prime mover used for operating a vehicle, an absolute pressure sensor configured to sense an absolute pressure, and a controller. The controller is configured to determine an altitude of the transport power system based on a first absolute pressure sensed during a start-up sequence of the transport power system prior to running of the prime mover, adjust a power output upper limit for the prime mover based on the determined altitude, and control an operation of the prime mover of the transport power system not to exceed the adjusted power output upper limit.

In an embodiment, a method for controlling an operation of a transport power system is provided. The method includes determining, by a controller of the transport power system, an altitude of the transport power system based on a first absolute pressure sensed by an absolute pressure sensor during a start-up sequence of the transport power system prior to running of a prime mover of the transport power system. The prime mover is separate from another prime mover used for operating a vehicle. The method also includes adjusting, by the controller, a power output upper limit for the prime mover based on the determined altitude. The method further includes controlling, by the controller, an operation of the prime mover of the transport power system not to exceed the adjusted power output upper limit.

Other features and aspects will become apparent by consideration of the following detailed description and accompanying drawings.

BRIEF DESCRIPTION OF THE DRAWINGS

References are made to the accompanying drawings that form a part of this disclosure and which illustrate the embodiments in which systems and methods described in this specification can be practiced.

Like reference numbers represent like parts throughout.

DETAILED DESCRIPTION

This disclosure relates generally to adjusting a power output upper limit for a prime mover of a transport power system. More specifically, the disclosure relates to systems and methods for adjusting a power output upper limit for a prime mover of a transport power system that can be used, for example, for powering a transport climate control system (TCCS) and having an altitude sensor and/or configuring a diesel particulate filter (DPF) backpressure sensor as an altitude sensor.

As defined herein, the phrase "diesel particulate filter" or "DPF" may refer to a device designed to remove e.g., diesel particulate matter, soot, or the like from the exhaust gas of a prime mover (e.g., a diesel powered compression ignition engine, or the like). It will be appreciated that unless specified otherwise, a prime mover described herein refers to a prime mover of a transport power system (e.g., a prime mover of an auxiliary power unit (APU), a prime mover of a TCCS, or the like), but not to a vehicle prime mover. That is, in some embodiments, there can be two or more distinct diesel engines on a same vehicle: one can be a main/vehicle (e.g., tractor, truck, or the like) engine used to move the vehicle, and the other can be an auxiliary engine (e.g., a diesel powered compression ignition engine) of the transport power system. Typically when the main/vehicle engine is running, the auxiliary engine is off, and vice versa. It will be appreciated that in some embodiments an electronic prime mover might not work with a diesel particulate filter. Embodiments disclosed herein can be directed to the diesel particulate filter for the auxiliary diesel powered compression ignition engine.

It will be appreciated that some embodiments of the DPF and the DPF regeneration are described in U.S. patent application Ser. No. 17/363,969 and U.S. patent application Ser. No. 17/682,490, which are incorporated by reference herein in their entirety.

As defined herein, the phrase "absolute pressure" may refer to a pressure measured relative to a full/absolute vacuum. A full vacuum has an absolute pressure reading of 0 pounds per square inch absolute (PSIA) and an average barometric pressure at sea level is at or about 14.7 PSIA. It will be appreciated that absolute pressure sensor(s) such as altimeters, barometers, or the like can produce readings that are not influenced by atmospheric pressure or weather. The absolute pressure sensor can use full vacuum as its zero point, and can read different pressures as a function of altitude. In contrast, a pressure that is measured against atmospheric pressure (also known as barometric pressure) can be called a gauge pressure. A gauge pressure can be referred to as a pressure of a system above atmospheric pressure. Gauge pressure can be zero-referenced against ambient air (or atmospheric) pressure, so gauge pressure readings include the pressure from the weight of the atmosphere. That is, a gauge pressure sensor reads 0 pounds per square inch (PSI) regardless of altitude and uses the ambient pressure as its zero point.

Embodiments disclosed herein can be applicable to e.g., box truck, self-powered truck, trailer, TRU, or the like, or dual prime mover system where a prime mover is independent to a vehicle prime mover. It will be appreciated that the control of the components of the system can be performed by a controller (e.g., the APU controller, the TCCS controller, or the like). Also, the embodiments described herein can also be applicable to a hybrid power system that uses both a prime mover and a rechargeable energy storage (e.g., battery).

Figure 1A:
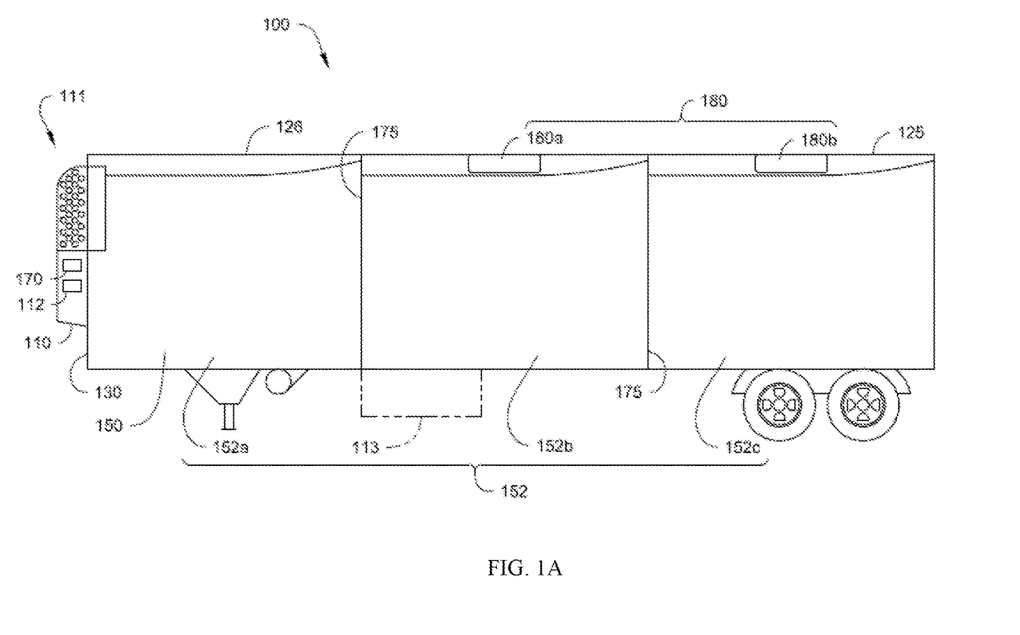
FIG. 1A illustrates a schematic cross sectional side view of a refrigerated transport unit with a multi-temp transport refrigeration system (MTRS), according to an embodiment.

FIG. 1A illustrates one embodiment of a MTRS 100 for a TU 125 that can be towed, for example, by a tractor (not shown). The MTRS 100 includes a TRU 110 and a plurality of remote evaporator units 180. The TRU 110 and each of the remote evaporator units 180 provide climate control (e.g. temperature, humidity, air quality, etc.) within a separate zone of the internal space 150. The TRU 110 can include, amongst other components, a refrigeration circuit that connects, for example, a compressor, a condenser, an evaporator and an expansion valve to provide climate control within the at least one of the zones of the internal space 150. Each of the evaporator units 180 can also be connected to the refrigeration circuit to provide climate control to a particular zone 152 of the internal space 150.

The MTRS 100 also includes a MTRS controller 170 and one or more sensors (e.g., Hall effect sensors, current transducers, etc.) that are configured to measure one or more parameters (e.g., ambient temperature, compressor suction pressure, compressor discharge pressure, supply air temperature, return air temperature, humidity, etc.) of the MTRS 100 and communicate parameter data to the MTRS controller 170. The MTRS 100 is powered by a power module 112. The TRU 110 is disposed on a front wall 130 of the TU 125. In other embodiments, it will be appreciated that the TRU 110 can be disposed, for example, on a rooftop 126 or another wall of the TU 125.

In some embodiments, the MTRS 100 can include an undermount unit 113. In some embodiments, the undermount unit 113 can be a TRU that can also provide environmental control (e.g. temperature, humidity, air quality, etc.) within the internal space 150 of the TU 125. The undermount unit 113 can work in combination with the TRU 110 to provide redundancy or can replace the TRU 110. Also, in some embodiments, the undermount unit 113 can be a power module that includes, for example, a generator that can help power the TRU 110.

The programmable MTRS Controller 170 may comprise a single integrated control unit or may comprise a distributed network of TRS control elements. The number of distributed control elements in a given network can depend upon the particular application of the principles described herein. The MTRS controller 170 is configured to control operation of the MTRS 100.

As shown in FIG. 1A, the power module 112 is disposed in the TRU 110. In other embodiments, the power module 112 can be separate from the TRU 110. Also, in some embodiments, the power module 112 can include two or more different power sources disposed within or outside of the TRU 110. In some embodiments, the power module 112 can include one or more of a prime mover, a battery, an alternator, a generator, a solar panel, a fuel cell, etc. Also, the prime mover can be a combustion engine or a microturbine engine and can operate as a two speed prime mover, a variable speed prime mover, etc. In some embodiments, for the prime mover, an absolute pressure sensor (configured to sense/measure an absolute pressure) and a DPF (configured to collect particulate such as carbon, soot, or the like that comes out of the tail pipe) can be provided. The power module 112 can provide power to, for example, the MTRS Controller 170, a compressor (not shown), a plurality of DC (Direct Current) components (not shown), a power management unit (not shown), etc. The DC components can be accessories or components of the MTRS 100 that require DC power to operate. Examples of the DC components can include, for example, DC fan motor(s) for a condenser fan or an evaporator blower (e.g., an Electrically Commutated Motor (ECM), a Brushless DC Motor (BLDC), etc.), a fuel pump, a drain tube heater, solenoid valves (e.g., controller pulsed control valves), etc.

The power module 112 can include a DC power source (not shown) for providing DC electrical power to the plurality of DC components (not shown), the power management unit (not shown), etc. The DC power source can receive mechanical and/or electrical power from, for example, a utility power source (e.g., Utility power, etc.), a prime mover (e.g., a combustion engine such as a diesel engine, etc.) coupled with a generator machine (e.g., a belt-driven alternator, a direct drive generator, etc.), etc. For example, in some embodiments, mechanical energy generated by a diesel engine is converted into electrical energy via a generator machine. The electrical energy generated via the belt driven alternator is then converted into DC electrical power via, for example, a bi-directional voltage converter. The bi-directional voltage converter can be a bi-directional multi-battery voltage converter.

The internal space 150 can be divided into a plurality of zones 152. The term "zone" means a part of an area of the internal space 150 separated by walls 175. It will be appreciated that the invention disclosed herein can also be used in a single zone TRS.

The MTRS 100 for the TU 125 includes the TRU 110 and a plurality of remote evaporator units 180. In some embodiments, an HVAC system can be powered by an Auxiliary Power Unit (APU, see FIG. 1B). The APU can be operated when a main prime mover of the TU 125 is turned off such as, for example, when a driver parks the TU 125 for an extended period of time to rest. The APU can provide, for example, power to operate a secondary HVAC system to provide conditioned air to a cabin of the tractor (not shown). The APU can also provide power to operate cabin accessories within the cabin such as a television, a microwave, a coffee maker, a refrigerator, etc. The APU can be a mechanically driven APU (e.g., prime mover driven) or an electrically driven APU (e.g., battery driven).

The tractor includes a vehicle electrical system for supplying electrical power to the electrical loads of the tractor, the MTRS 100, and/or the TU 125.

Figure 1B:
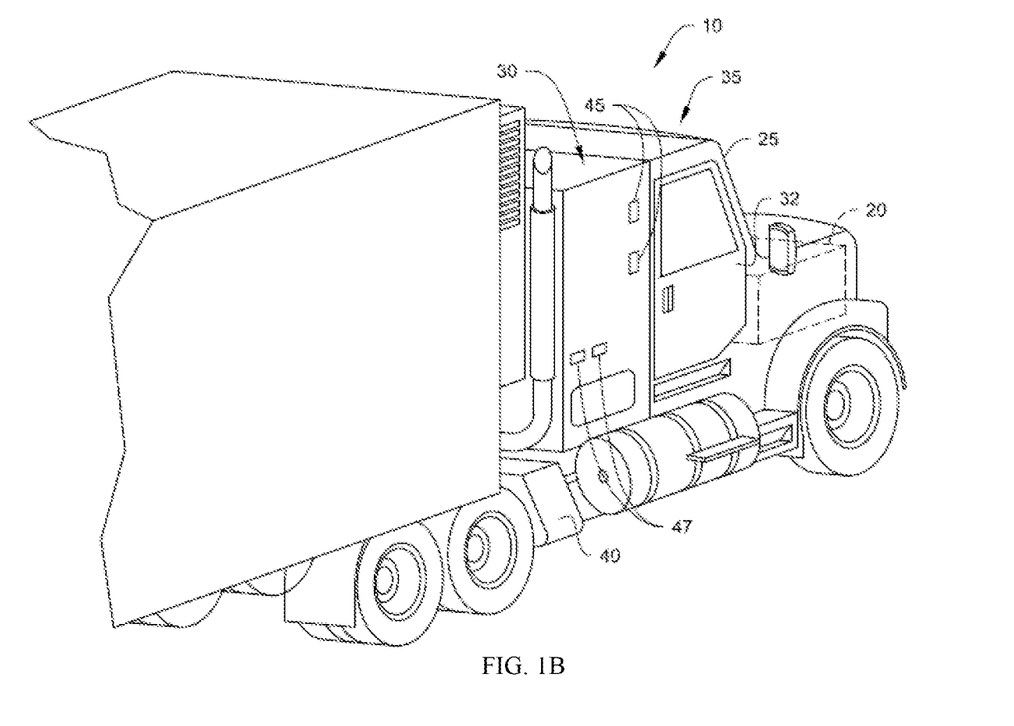
FIG. 1B illustrates a perspective view of a vehicle with an auxiliary power unit, according to an embodiment.

FIG. 1B illustrates a vehicle 10 according to one embodiment. The vehicle 10 is a semi-tractor that is used to transport cargo stored in a cargo compartment (e.g., a container, a trailer, etc.) to one or more destinations. Hereinafter, the term "vehicle" shall be used to represent all such tractors and trucks, and shall not be construed to limit the present application solely to a tractor in a tractor-trailer combination. In some embodiments, the vehicle 10 can be, for example, a straight truck, van, etc.

The vehicle 10 includes a primary power source 20, a cabin 25 defining a sleeping portion 30 and a driving portion 35, an APU 40, and a plurality of vehicle accessory components 45 (e.g., electronic communication devices, cabin lights, a primary and/or secondary HVAC system, primary and/or secondary HVAC fan(s), sunshade(s) for a window/windshield of the vehicle 10, cabin accessories, etc.). The cabin 25 can be accessible via a driver side door (not shown) and a passenger side door 32. The cabin 25 can include a primary HVAC system (not shown) that can be configured to provide conditioned air within driving portion 35 and potentially the entire cabin 25, and a secondary HVAC system (not shown) for providing conditioned air within the sleeping portion 30 of the cabin 25. The cabin 25 can also include a plurality of cabin accessories (not shown). Examples of cabin accessories can include, for example, a refrigerator, a television, a video game console, a microwave, device charging station(s), a continuous positive airway pressure (CPAP) machine, a coffee maker, a secondary HVAC system for providing conditioned air to the sleeping portion 30.

The primary power source 20 can provide sufficient power to operate (e.g., drive) the vehicle 10 and any of the plurality of vehicle accessory components 45 and cabin accessory components 47. The primary power source 20 can also provide power to the primary HVAC system and the secondary HVAC system. In some embodiments, the primary power source can be a prime mover such as, for example, a combustion engine (e.g., a diesel engine, etc.).

The APU 40 is a secondary power unit for the vehicle 10 when the primary power source 20 is unavailable. When, for example, the primary power source 20 is unavailable, the APU 40 can be configured to provide power to one or more of the vehicle accessory components, the cabin accessories, the primary HVAC system and the secondary HVAC system. In some embodiments, the APU 40 can be an electric powered APU. In other embodiments, the APU 40 can be a prime mover powered APU. The APU 40 can be attached to the vehicle 10 using any attachment method. In some embodiments, the APU 40 can be turned on (i.e., activated) or off (i.e., deactivated) by an occupant (e.g., driver or passenger) of the vehicle 10. The APU 40 generally does not provide sufficient power for operating (e.g., driving) the vehicle 10. The APU 40 can be controlled by an APU controller 41. In some embodiments, the APU 40 can include an absolute pressure sensor configured to sense/measure an absolute pressure and a DPF configured to collect particulate such as carbon, soot, or the like that comes out of the tail pipe.

Figure 1C:
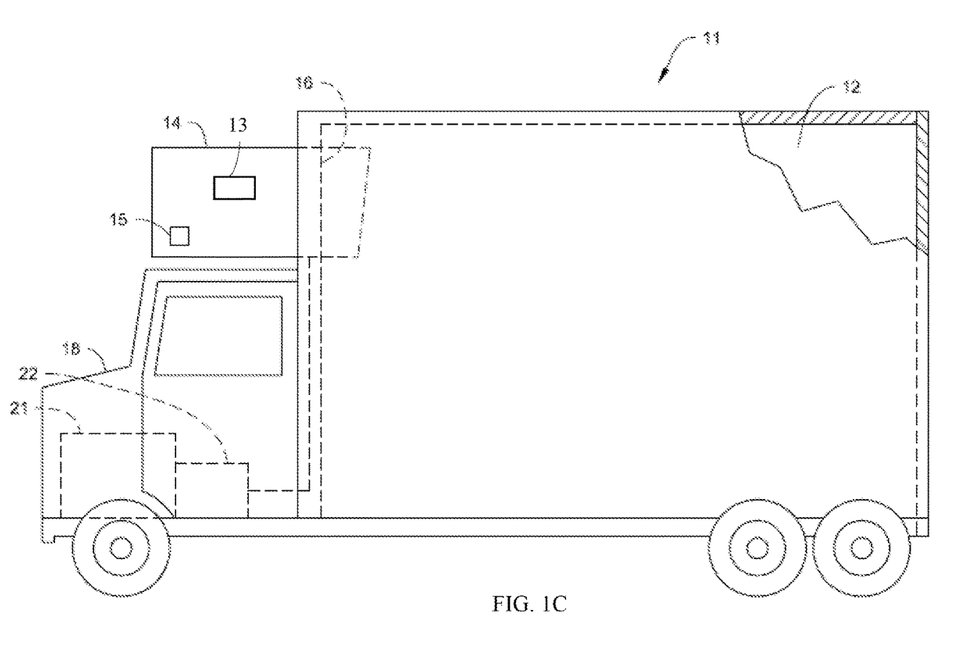
FIG. 1C illustrates a side view of a truck with a front wall mounted vehicle powered transport refrigeration unit, according to an embodiment.

FIG. 1C depicts a temperature-controlled straight truck 11 that includes a conditioned load space 12 for carrying cargo. A transport refrigeration unit (TRU) 14 is mounted to a front wall 16 of the load space 12. The TRU 14 is controlled via a controller 15 to provide temperature control within the load space 12. The truck 11 further includes a vehicle power bay 18, which houses a truck prime mover 21, such as a combustion engine (e.g., diesel engine, etc.), that provides power to move the truck 11. In some embodiments, the truck prime mover 21 can work in combination with an optional machine 22 (e.g., an alternator). The TRU 14 includes a prime mover 13. In an embodiment, the prime mover 13 can be a combustion engine (e.g., diesel engine, etc.) to provide power to the TRU 14. In some embodiments, for the prime mover 13, an absolute pressure sensor (configured to sense/measure an absolute pressure) and a DPF (configured to collect particulate such as carbon, soot, or the like that comes out of the tail pipe) can be provided. In one embodiment, the TRU 14 includes a vehicle electrical system. Also, in some embodiments, the TRU 14 can be powered by the prime mover 13 in combination with a battery power source or by the optional machine 22. In some embodiments, the TRU 14 can also be powered by the truck prime mover 21 in combination with a battery power source or the optional machine 22.

While FIG. 1C illustrates a temperature-controlled straight truck 11, it will be appreciated that the embodiments described herein can also apply to any other type of transport unit including, but not limited to, a van, a container (such as a container on a flat car, an intermodal container, etc.), a box car, or other similar transport unit.

Figure 2:
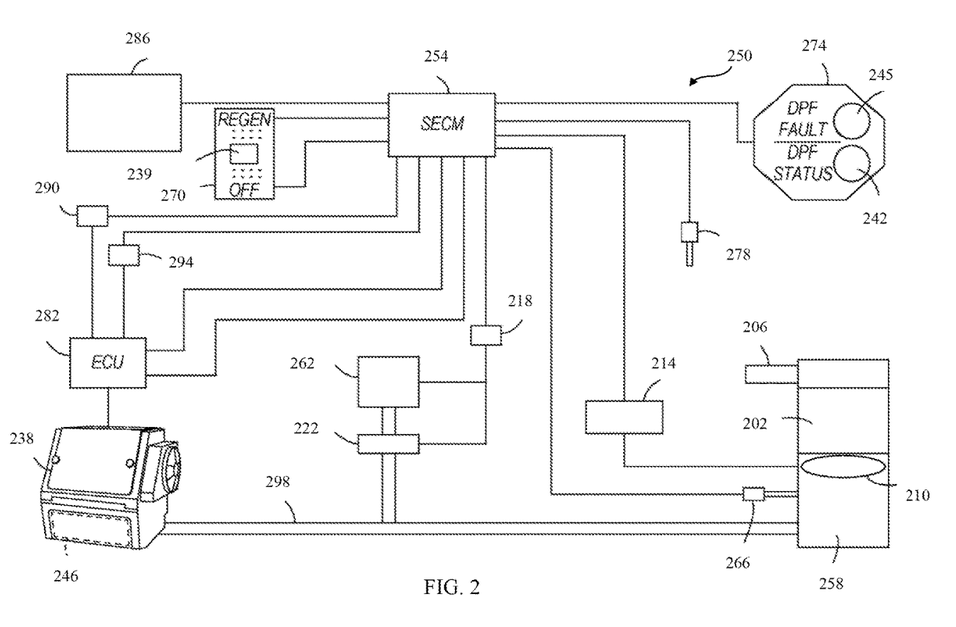
FIG. 2 is a schematic of an auxiliary power unit with an exhaust system, according to an embodiment.

FIG. 2 is a schematic of an auxiliary power unit (APU) 238 with an exhaust system 250, according to an embodiment. As shown in FIG. 2, the exhaust system 250 can be coupled to the auxiliary power unit 238. In an embodiment, the illustrated exhaust system 250 can include a control module 254, a diesel particulate filter (DPF) 258, a blower 262, a pressure sensor 266, a control switch 270, a system indicator 274, and/or an ambient temperature sensor 278. The control module 254 can be electrically coupled to an electronic control unit 282 (ECU) of the auxiliary power unit 238 and to the other components of the exhaust system 250 to receive, process, and transmit information to and from the components. It will be appreciated that controls described herein can be performed by a controller (e.g., control module 254, the controller of the transport refrigeration unit/system of FIGS. 1A and 1C, the controller of the APU of FIG. 1B, or the like). The controller can connect to and control the components via e.g., wireless or wired connections. The control module 254 can also be coupled to an ignition 286 of the vehicle (see vehicle 10 of FIG. 1B) such that the control module 254 receives status information from the primary mover (see prime mover 20 of FIG. 1B) of the vehicle 10. In the illustrated construction, the control module 254 can be a small engine control module (SECM) that is compatible with the prime mover (e.g., a diesel engine or the like) 246 of the auxiliary power unit 238. The prime mover 246 can be, for example, a prime mover of the APU, a prime mover of the transport refrigeration unit/system of FIGS. 1A and 1C, or the like. In some embodiments, the prime mover 246 is separate from a prime mover used for operating a vehicle. The control module 254 receives ignition and engine running status from the auxiliary power unit 238 so that the control module 254 can monitor when and at what strength the auxiliary power unit 238 is running. The control module 254 is also operable to sends signals to the ECU 282 through relays 290, 294 to interrupt and/or shutdown operation of the auxiliary power unit 238.

The DPF 258 is positioned downstream of the prime mover 246 of the auxiliary power unit 238 to receive exhaust from the prime mover 246 through an exhaust pipe 298. In the illustrated construction, the DPF 258 can be an electrically-powered active DPF or any suitable DPF. The DPF 258 includes a filter element 202 operable to remove particulate matter such as carbon, soot, or the like from exhaust exiting the prime mover 246. In the illustrated construction, the filter element 202 can be a non-catalyzed, silicon-carbide wall-flow exhaust filter element, although other suitable filter elements may also or alternatively be employed. Exhaust flows from the prime mover 246, through the exhaust pipe 298, and into the DPF 258. As the exhaust travels through the DPF 258, the exhaust flows through the filter element 202 such that clean exhaust is released into the environment through an outlet 206 of the DPF 258. During such operation, particulate matter and soot gradually build-up and collect on the filter element 202. Once the amount of particulate matter accumulated on the filter element 202 reaches a certain level or threshold, the DPF 258 should be regenerated to clean the filter element 202.

In the illustrated construction, the exhaust system 250 can also include a heating element 210 electrically coupled to the control module 254. The heating element 210 can be positioned adjacent to or within the filter element 202 of the DPF 258 to heat the filter element 202 and thereby promote regeneration. The illustrated heating element 210 can be an integrated 12-volt high current electrical coil operable to radiate heat for an extended period of time (e.g., one hour or more) to regenerate the filter element 202. A contactor 214 can be electrically coupled between the control module 254 and the heating element 210 to help control the power input to the heating element 210. In other constructions, other suitable regeneration promoting means may be employed as an alternative to or in conjunction with the illustrated heating element 210.

The blower 262 can be coupled to the control module 54 through a relay 218. In the illustrated construction, the blower 262 can be in communication with the exhaust pipe 298 to supply oxygenated ambient air, when a valve 222 is open, to exhaust exiting the prime mover 246 of the auxiliary power unit 238. The ambient air helps sustain oxidation of particulate matter and soot in the exhaust during regeneration of the DPF 258. The valve 222 (e.g., a solenoid valve) is positioned between the blower 262 and the exhaust pipe 298 and is also coupled to the control module 54 through the relay 218. During normal operation of the auxiliary power unit 238 (i.e., not during regeneration of the DPF 258), the valve 222 can be closed to inhibit exhaust in the pipe 298 from entering the blower 262, and thereby bypassing the DPF 258.

The pressure sensor 266 can be coupled to the DPF 258 and the control module 254 to notify the control module 254 when the DPF 258 should be regenerated. In the illustrated construction, the pressure sensor 266 can be a single sensor positioned upstream of the filter element 202 to measure exhaust backpressure within the DPF 258. The measured backpressure pressure generally corresponds to a particulate matter accumulation level on the filter element 202. When the measured backpressure reaches or exceeds a predetermined value (i.e., a regeneration threshold), the control module 254 notifies a user to initiate regeneration of the DPF 258 or starts a regeneration process. In some constructions, the regeneration threshold indicates when a sufficient amount of particulate matter has accumulated on the filter element 202 to support regeneration. In other constructions, the regeneration threshold is set a predetermined length of time before the particulate matter and soot accumulates to a level where the DPF 258 can no longer function properly. In some embodiments, the single pressure sensor 266 can be an absolute pressure sensor as opposed to a gauge pressure sensor. As an absolute pressure sensor, the single pressure 266 can be configured to sense an absolute pressure that can produce readings that are not influenced by atmospheric pressure or weather. The absolute pressure sensor can use full vacuum as its zero point, and can read different pressures as a function of altitude.

In further constructions, the exhaust system 250 may additionally or alternatively include an engine runtime sensor. In such constructions, the runtime sensor is coupled to the prime mover 246 and the ECU 282 of the auxiliary power unit 238. The runtime sensor can monitor how long and/or at what speeds the prime mover 246 has been running. Similar to exhaust backpressure, engine runtime and operation speed generally correspond to the accumulation level of particulate matter and soot on the filter element 202 of the DPF 258. After the prime mover 246 runs for a predetermined length of the time, the ECU 282 can signal the control module 254 to notify a user to initiate regeneration of the DPF 258.

The control switch 270 can be electrically coupled to the control module 254 and is positioned within the cabin 25 (see FIG. 1B) of the vehicle 10. The control switch 270 can allow a user (e.g., the driver or passenger of the vehicle 10) to start regeneration of the DPF 258 at his or her convenience. Regeneration of the DPF 258 typically requires electrical power for an extended period of time (e.g., more than an hour). With the switch 270, the user can initiate regeneration when he or she knows the primary vehicle prime mover 20 (see FIG. 1B) will be kept at or above e.g., approximately 1150 revolutions per minute during this time. The DPF 258 can therefore be regenerated using only excess power from the primary prime mover 20, without requiring supplemental power from vehicle batteries or from another external power source.

The illustrated control switch 270 can be a three-position switch that is movable between a home position, a regeneration position, and an off position. The control switch 270 can be normally biased to the home, or middle, position. In the home position, the auxiliary power unit 238 and the DPF 258 are operational such that the DPF 258 filters particulate matter and soot from exhaust exiting the prime mover 246 of the auxiliary power unit 238. Actuating (e.g., depressing) the switch 270 to the regeneration, or upper, position initiates regeneration of the DPF 258. In the illustrated construction, the regeneration position is a momentary position that begins the regeneration. Once released, the switch 270 is immediately biased back to the home position, but regeneration of the DPF 258 continues until it is completed or interrupted. Actuating (e.g., depressing) the switch 270 to the off, or lower, position cuts off power to the auxiliary power unit 238 and the DPF 258, interrupting operation of the auxiliary power unit 238 and/or regeneration of the DPF 258. In the illustrated construction, the off position is a latching position such that the switch 270 remains in the off position until it is manually actuated back to the home position or the regeneration position.

The illustrated control switch 270 can include a light emitting diode 239 (LED) that indicates the current status of the DPF 258. In the illustrated construction, the LED 239 turns on to notify a user to regenerate the DPF 258 (e.g., when the measured exhaust backpressure reaches or exceeds a regeneration threshold). In some constructions, the LED 239 may blink while the DPF 258 is regenerating and/or may turn off when the auxiliary power unit 238 and the DPF 258 are disabled or otherwise shutdown. In other constructions, the switch 270 may include multiple LEDs and/or different types of indicators to notify a user of the status of the auxiliary power unit 238 and the DPF 258.

The system indicator 274 can be electrically coupled to the control module 254 and can be positioned within a sleeping section of the cabin 25 (see FIG. 1B) of the vehicle 10. The indicator 274 can generally provide the same information to a user as the control switch 270, but at a different location within the vehicle cabin 25. The illustrated indicator 274 includes a first LED 242 to notify a user of the current status of the DPF 258 (e.g., if the DPF 58 needs to be regenerated, is regenerating, and/or is off). The indicator 274 can also include a second LED 245 to notify the user if there is a fault with the auxiliary power unit 238 and/or the DPF 258.

The ambient temperature sensor 278 can be electrically coupled to the control module 254 and is mounted to the frame or the body of the vehicle 10 (see FIG. 1B). In the illustrated construction, the temperature sensor 278 can be a thermistor or other suitable temperature sensing transducer. The temperature sensor 278 can monitor the temperature of the environment and outputs a signal indicative of the measured temperature to the control module 254. Ambient temperature generally affects the rate at which particulate matter and soot accumulate on the filter element 202 of the DPF 258. At relatively lower ambient temperatures, particulate matter and soot accumulate faster on the filter element 202. At relatively higher ambient temperatures, particulate matter and soot accumulate slower on the filter element 202. The control module 254 therefore can use the measured ambient temperature to adjust the regeneration threshold of the DPF 258, thereby compensating for environmental effects on the exhaust system 250.

It will be appreciated that the APU 238 or the TRU or the TCCS can include sensors (e.g., temperature, pressure, humidity, motion, voltage, current, battery status, battery charging level, or the like) or the APU 238 or the TRU or the TCCS can communicate with sensors associated or embedded with a cargo. The controller 254 of the APU 238 or the TRU or the TCCS can obtain data sensed by the sensors and control the settings of the components (e.g., the prime mover 246, the DPF 258, the pressure sensor 266, or the like) of the TCCS or the APU 238. In an embodiment, the prime mover 246 of the APU 238 can be a combustion engine (e.g., a diesel engine, or the like). The APU 238 can be configured to provide power to operate a plurality of cabin accessories such as a refrigerator, a television, a video game console, a microwave, device charging station(s), a continuous positive airway pressure (CPAP) machine, a coffee maker, a secondary HVAC system (that is independent to and/or in addition to a primary HVAC system) for providing conditioned air to the sleeping portion of the cabin. The primary HVAC system and/or the secondary HVAC system can each include a compressor (not shown).

Figure 3:
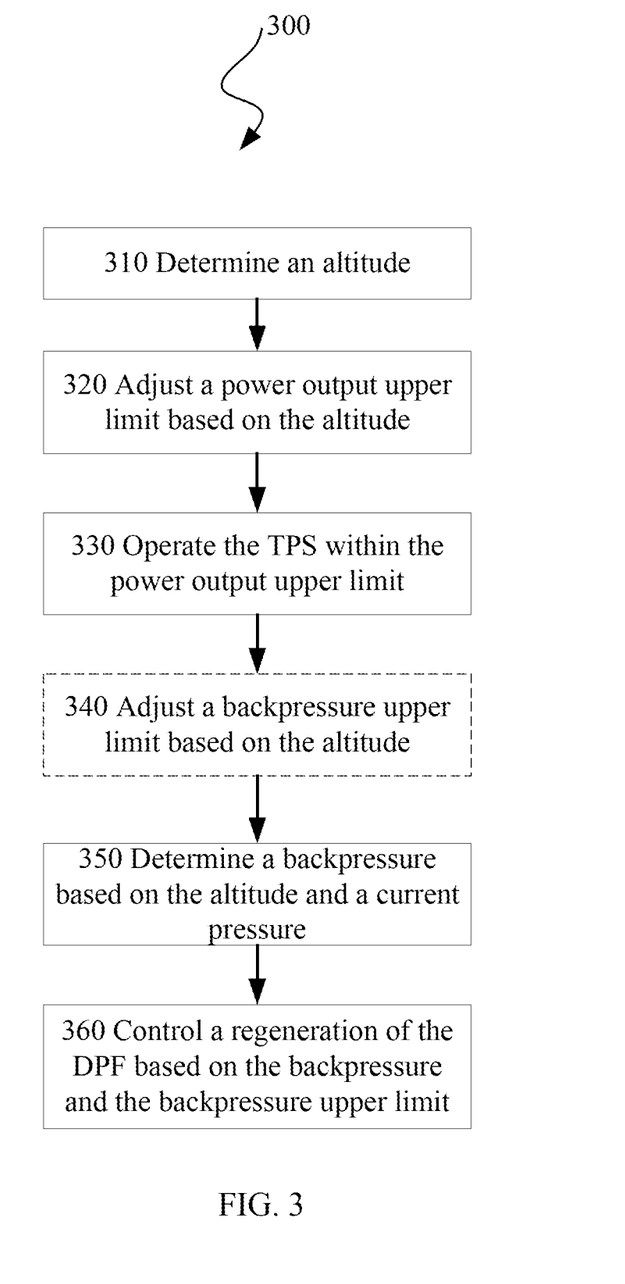
FIG. 3 is a flow chart illustrating a method of controlling an operation of a transport power system, according to an embodiment.

FIG. 3 is a flow chart illustrating a method 300 of controlling an operation of a transport power system (e.g., an APU), according to an embodiment.

It will be appreciated that the method 300 disclosed herein can be conducted by a controller (e.g., the controller of the transport refrigeration unit/system of FIGS. 1A and 1C, the controller of the APU of FIG. 1B, the control module of FIG. 2, or any suitable processor(s)), unless otherwise specified. The controller can include a processor, memory, and/or communication ports to communicate with e.g., other components of the TCCS or APU or with equipment or systems located in proximity to the TCCS or APU or a cargo load. The controller can communicate with other components using e.g., powerline communications, Pulse Width Modulation (PWM) communications, Local Interconnect Network (LIN) communications, Controller Area Network (CAN) communications, etc., and using any suitable communications including wired and/or wireless, analog and/or digital communications. In an embodiment, the communication can include communications over telematics of the TCCS or APU, which the TCCS or APU may include or which may be communicatively connected to the TCCS (e.g., telematics equipment, mobile phone, vehicle communication system, etc.). The TCCS or APU can include sensors (e.g., temperature, pressure, humidity, motion, voltage, current, battery status, battery charging level, or the like) or the TCCS or APU can communicate with sensors associated or embedded with a cargo. The controller can obtain data sensed by the sensors and control the settings of the components (e.g., the prime mover 246, the DPF 254, the pressure sensor 266 of FIG. 2, or the like) of the TCCS or APU.

It will also be appreciated that the method 300 can include one or more operations, actions, or functions depicted by one or more blocks. Although illustrated as discrete blocks, various blocks may be divided into additional blocks, combined into fewer blocks, or eliminated, depending on the desired implementation. The method 300 begins at 310.

At 310, the controller determines an altitude of the transport power system based on an absolute pressure sensed (e.g., by an absolute pressure sensor such as the single pressure sensor 266 of FIG. 2) during a start-up sequence of the transport power system prior to running of the prime mover of the transport power system.

It will be appreciated that when the prime mover used for operating the vehicle is running, the prime mover (e.g., a diesel engine of the transport power system, or the like) disclosed herein typically can be off, and vice versa. That is, during a start-up sequence (of the transport power system or of the prime mover of the transport power system), the prime mover used for operating the vehicle is off, the vehicle is in stationary, and the altitude of the vehicle (and the transport power system) is not changing (i.e., staying constant) throughout e.g., the entire time period when the transport power system or the prime mover of the transport power system is running. The start-up sequence can be referred to or defined as a sequence of actions that initialize the transport power system and prepare for a start of the prime mover of the transport power system (i.e., prior to running of the prime mover of the transport power system). During the start-up sequence, typically there is no build-ups (of the soot, etc.) and/or no backpressure in the exhaust system of the transport power system. In an embodiment, the absolute pressure sensor can be disposed in the exhaust stream of the transport power system prime mover and configured to measure/sense an (ambient) absolute pressure.

The absolute pressure sensor can be configured or controlled to measure/sense a first absolute pressure during the start-up sequence. The controller can determine or deduce an altitude based on the sensed first absolute pressure (e.g., via a look-up table, or the like).

The method 300 proceeds to 320. At 320, the controller adjusts a power output upper limit for the prime mover of the transport power system based on the altitude determined at 310.

It will be appreciated that the transport power system and the prime mover of the transport power system can be bound by emissions regulations. For example, one of the emissions regulations is not to exceed (NTE, a regulation threshold that limits power output for emissions) limit. The NTE limit can be a power level that the transport power system or the transport power system prime mover are not allowed to exceed, because above such power level, the emissions of the prime mover can be too high to meet the regulation requirements. In an embodiment, for a particular transport power system, a 2-cylinder diesel engine that is rated with the Environmental Protection Agency (EPA) can be a full power (e.g., 100% power) engine and can be used as the prime mover of the transport power system, but the NTE limit can be a derated power at a certain altitude. The reason for the difference between these two values is that as the prime mover (engine) of the transport power system is used at higher altitudes, the emissions performance may decrease. The NTE value can be the power limit (e.g., the power output upper limit) of the prime mover at a first altitude (e.g., at or about 5,500 feet above sea level). Without altitude sensing capability (e.g., no sensor to detect or deduce altitude), an assumption (that the transport power system/vehicle is always at the first altitude) may have to be made so that the NTE is at or below the derated power level, to avoid potential violation of the emissions regulations. That is, the transport power system (or the prime mover of the transport power system) may be under-utilized e.g., at an altitude lower than the first altitude where the emissions performance may increase compared with the emissions performance at the first altitude.

To account for the under-utilization issue, the altitude determined at 310 can be used for the controller to adjust a power output upper limit (e.g., the NTE limit) for the prime mover of the transport power system. For example, at the first altitude (e.g., at or about 5,500 feet above sea level), the power output upper limit (e.g., the power limit or the NTE limit) of the prime mover of the transport power system can be at the derated power, to meet certain emissions regulation requirements. As the prime mover is used at higher altitudes, the emissions performance decreases. That is, when the prime mover is used at lower altitudes, the emissions performance increases. For example, when the altitude of the transport power system/vehicle decreases from the first altitude, the emissions performance of the prime mover of the transport power system increases, and the power output upper limit (e.g., the power limit or the NTE limit) of the prime mover of the transport power system can be greater than the derated power (e.g., up to the maximum capability of the prime mover at the full power at sea level), to meet the same emissions regulation requirements.

In an embodiment, to meet the same emissions regulation requirements, the controller can increase a power output upper limit (e.g., the NTE limit) for the prime mover of the transport power system (up to e.g., up to the maximum capability of the prime mover) when the altitude of the transport power system decreases; and the controller can decrease the power output upper limit (e.g., the NTE limit) for the prime mover of the transport power system when the altitude of the transport power system increases.

It will be appreciated that the controller can determine the power output upper limit (e.g., the NTE limit) for the prime mover of the transport power system based on the altitude e.g., using an altitude versus power curve or map, and/or using a lookup table, etc., so that the controller can control the allowable power of the transport power system below or within the limit level (i.e., set the limit as the maximum power that the transport power system can operate). The curve or map can be based on the manufacture specification, experimental results, simulation or the like.

It will also be appreciated that because of the altitude features disclosed herein, additional power of the prime mover of the transport power system can be used, allowing to utilize e.g., additional cooling power or battery charging power, while without the altitude features, the power consumption thereof may need to be managed and reduced.

The method 300 proceeds to 330. At 330, the controller controls an operation of the prime mover of the transport power system (TPS) or an operation of the transport power system so that the power output of the prime mover of the transport power system or the power output of the transport power system does not exceed the power output upper limit (e.g., adjusted/increased/decreased at 320).

The method 300 proceeds to optional 340. At 340, the controller adjusts a backpressure upper limit for the DPF based on the determined altitude. It will be appreciated that the backpressure (e.g., the transport power system prime mover exhaust backpressure) can be referred to or defined as an exhaust gas pressure that is produced by the prime mover to overcome the hydraulic resistance of the exhaust system in order to discharge the gases into the atmosphere. A backpressure limit (e.g., an upper limit) can be used to determine when to regenerate the DPF.

Embodiments disclosed herein can enable varying the DPF fill level (e.g., soot fill level) as a function of the altitude. For a given backpressure limit, the actual amount of fill of the DPF can vary as a function of the altitude since the air density factors into how much backpressure can be generated. Embodiments disclosed herein can allow to potentially cut of an operation of the DPF (to regenerate the DPF) sooner or later as a function of the altitude to maintain peak performance and reliability of the DPF system.

It will be appreciated that the higher the altitude, the less air density, the less total exhaust resistance, the particulate matter increases, the allowable power (i.e., the power output limit) might have to go down (since more power associated with higher particulate matter), and the backpressure upper limit can be decreased (i.e., cutting of an operation of the DPF (to regenerate the DPF) sooner).

For example, at the first altitude (e.g., at or about 5,500 feet above sea level), the controller can determine a backpressure upper limit (e.g., at or around 10 kilopascal (kPa)) for the DPF based on the first altitude for an operation condition of the DPF. When the altitude decreases (from the first altitude), the controller can increase the backpressure upper limit (e.g., to a number greater than 10 kPa) for the same operation condition of the DPF. At another altitude (e.g., at or about sea level), the controller can determine a backpressure upper limit for the DPF based on such altitude for an operation condition of the DPF. When the altitude increases (from such altitude), the controller can decrease the backpressure upper limit for the same operation condition of the DPF. For example, for at or about 3 kW power output of a prime mover of a transport power system at sea level, compared with 3 kW at a certain altitude (that is higher than sea level), there can be more particulate matter at such altitude than at sea level. Thus, at such altitude, if the particulate matter (emission) is to be limited, the allowable power output of the transport power system (e.g., the allowable power output of the prime mover of the transport power system) needs to be reduced, and/or the backpressure upper limit needs to be decreased, compared with those at sea level.

The method 300 proceeds to 350. At 350, the controller determines a backpressure for the DPF based on the first absolute pressure (sensed at 310) and a second absolute pressure sensed when the prime mover of the transport power system is running. In an embodiment, the DPF can be disposed in an exhaust system of the transport power system. When the transport power system is running, particulate matter such as soot gradually builds-up and accumulates on the DPF. A second absolute pressure can be sensed by the absolute pressure sensor when the prime mover of the transport power system is running.

For example, the first absolute pressure sensed at 310 can be at or about 110 kPa. After a while, when the transport power system (and/or the prime mover of the transport power system) is running, the second absolute pressure (which can be greater than the first absolute pressure since the pressure is increasing when the prime mover of the transport power system is running) sensed can be at or about 112 kPa. The delta pressure (2 kPa, a difference between the second absolute pressure sensed during the running of the transport power system and the first absolute pressure sensed at 310) can be used as a backpressure for the DPF to compare with a backpressure upper limit (predetermined or adjusted/increased/decreased at 340).

That is, the controller can use an absolute pressure sensor to determine a backpressure as a result of DPF filling, which can be used to determine how full the DPF is (to determine a fill level of the DPF). It will be appreciated that determining a backpressure for the DPF may only occur when the prime mover of the transport power system is running (the DPF fills up and there is more backpressure which can be determined based on the measurements of the absolute pressure sensor). When the prime mover of the transport power system is not running (e.g., during a start-up sequence or the like), the same/single absolute pressure sensor can be used to determine the altitude of the transport power system (e.g., based on the first absolute pressure sensed at 310), which can be used to change the power output upper limit of the transport power system (e.g., to allow power usage over the derated power).

The method 300 proceeds to 360. At 360, the controller controls a regeneration of the DPF when the determined backpressure of the DPF is above a backpressure upper limit (or the backpressure upper limit adjusted/increased/decreased at 340). The backpressure upper limit can be a DPF regeneration pressure. That is, the DPF needs pressure feedback since the DPF collects particulate matter such as soot overtime, builds backpressure in the exhaust system, needs to clean the particulate matter out, and needs to determine when to clean the particulate matter out by comparing the backpressure determined at 350 with a certain backpressure threshold (a predetermined backpressure upper limit or the backpressure upper limit adjusted/increased/decreased at 340).

That is, if the backpressure determined at 350 is higher than a backpressure upper limit (a predetermined backpressure upper limit or the backpressure upper limit adjusted at 340), the controller is configured to control a regeneration of the DPF (as described herein). If the backpressure determined at 350 is at or lower than the backpressure upper limit (a predetermined backpressure upper limit or the backpressure upper limit adjusted at 340), no action with respect to regeneration may be taken.

It will be appreciated that at a higher altitude, there can be less air density, and for a same operating condition, a smaller backpressure may be determined (i.e., less backpressure for the same air flow since the air has lower density). For example, given a 10 kPa delta pressure (the determined backpressure) at sea level, by increasing the altitude of the transport power system, the backpressure threshold (upper limit) may be lower (i.e., regenerating the DPF at a lower delta) because of the reduced density of the air (i.e., less total resistance) (since for a same amount of particulate matter to build up, the delta pressure at such altitude may be less than 10 kPa), so the altitude can be used to adjust the backpressure threshold regarding when to regenerate to e.g., prevent overloading filter of the DPF.

It will be appreciated that the orders of 320 to 360 may vary. For example, in an embodiment, (320, 330) may occur before or after (340, 350, 360) or (350, 340, 360). In another embodiment, (320, 340, 350), (320, 350, 340), (340, 320, 350), (340, 350, 320), (350, 320, 340), or (350, 340, 320) may occur before (330, 360) or (360, 330).

Aspects:

It is appreciated that any of aspects 1-8 and 9-16 can be combined.

Aspect 1. A transport power system comprising:
 a prime mover separate from another prime mover used for operating a vehicle;
 an absolute pressure sensor configured to sense an absolute pressure; and
 a controller,
 wherein the controller is configured to:
 determine an altitude of the transport power system based on a first absolute pressure sensed during a start-up sequence of the transport power system prior to running of the prime mover,
 adjust a power output upper limit for the prime mover based on the determined altitude,
 control an operation of the prime mover of the transport power system not to exceed the adjusted power output upper limit.

Aspect 2. The transport power system according to aspect 1, wherein the controller is further configured to:
 increase the power output upper limit for the prime mover when the determined altitude is less than an altitude threshold.

Aspect 3. The transport power system according to aspect 1 or aspect 2, further comprising:
 a diesel particulate filter (DPF) disposed in an exhaust system of the transport power system,
 wherein the controller is further configured to:
 determine a backpressure of the DPF based on the first absolute pressure and a second absolute pressure sensed when the prime mover of the transport power system is running.

Aspect 4. The transport power system according to aspect 3, wherein the controller is further configured to:

control a regeneration of the DPF when the determined backpressure of the DPF reaches a backpressure upper limit.

Aspect 5. The transport power system according to aspect 3, wherein the controller is further configured to:

adjust a backpressure upper limit for the DPF based on the determined altitude.

Aspect 6. The transport power system according to aspect 5, wherein the controller is further configured to:

control a regeneration of the DPF when the determined backpressure of the DPF reaches the adjusted backpressure upper limit.

Aspect 7. The transport power system according to any one of aspects 1-6, wherein the prime mover is a diesel engine.

Aspect 8. A method for controlling an operation of a transport power system, the method comprising:

determining, by a controller of the transport power system, an altitude of the transport power system based on a first absolute pressure sensed by an absolute pressure sensor during a start-up sequence of the transport power system prior to running of a prime mover of the transport power system, the prime mover being separate from another prime mover used for operating a vehicle, adjusting, by the controller, a power output upper limit for the prime mover based on the determined altitude, controlling, by the controller, an operation of the prime mover of the transport power system not to exceed the adjusted power output upper limit.

Aspect 9. The method according to aspect 8, further comprising:

increasing the power output upper limit for the prime mover when the determined altitude is less than an altitude threshold.

Aspect 10. The method according to aspect 8 or aspect 9, further comprising:

determining a backpressure of a diesel particulate filter (DPF) based on the first absolute pressure and a second absolute pressure sensed when the prime mover of the transport power system is running, the DPF being disposed in an exhaust system of the transport power system.

Aspect 11. The method according to aspect 10, further comprising:

controlling a regeneration of the DPF when the determined backpressure of the DPF reaches a backpressure upper limit.

Aspect 12. The method according to aspect 10, further comprising:

adjusting a backpressure upper limit for the DPF based on the determined altitude.

Aspect 13. The method according to aspect 12, further comprising:

controlling a regeneration of the DPF when the determined backpressure of the DPF reaches the adjusted backpressure upper limit.

Aspect 14. The method according to any one of aspects 8-13, wherein the prime mover is a diesel engine.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A transport power system comprising:
   a prime mover separate from and independent to a vehicle engine used for operating a vehicle;
   an absolute pressure sensor configured to sense an absolute pressure; and
   a controller configured to communicate with the prime mover and the absolute pressure sensor,
   wherein the controller is configured to:
   determine an altitude of the transport power system with respect to sea level based on a first absolute pressure sensed by the absolute pressure sensor during a start-up sequence of the transport power system prior to running of the prime mover,
   determine a power output of the prime mover,
   adjust a power output upper limit for the prime mover based on the determined altitude,
   compare the power output of the prime mover and the adjusted power output upper limit,
   operate the prime mover of the transport power system so as not to exceed the adjusted power output upper limit.

2. The transport power system according to claim 1, wherein the controller is further configured to:
   compare the determined altitude with an altitude threshold,
   increase the power output upper limit for the prime mover when the determined altitude is less than the altitude threshold.

3. The transport power system according to claim 1, further comprising:
   a diesel particulate filter (DPF) disposed in an exhaust system of the transport power system,
   wherein the controller is further configured to:
   determine a backpressure of the DPF based on the first absolute pressure and a second absolute pressure sensed by the absolute pressure sensor when the prime mover of the transport power system is running.

4. The transport power system according to claim 3, wherein the controller is further configured to:
   compare the determined backpressure of the DPF with a backpressure upper limit,
   control a regeneration of the DPF when the determined backpressure of the DPF reaches the backpressure upper limit.

5. The transport power system according to claim 3, wherein the controller is further configured to:
   adjust a backpressure upper limit for the DPF based on the determined altitude.

6. The transport power system according to claim 5, wherein the controller is further configured to:
   control a regeneration of the DPF when the determined backpressure of the DPF reaches the adjusted backpressure upper limit.

7. The transport power system according to claim 1, wherein the prime mover is a diesel engine.

8. A method for controlling an operation of a transport power system, the method comprising:
- determining, by a controller of the transport power system, an altitude of the transport power system with respect to sea level based on a first absolute pressure sensed by an absolute pressure sensor during a start-up sequence of the transport power system prior to running of a prime mover of the transport power system, the prime mover being separate from and independent to a vehicle engine used for operating a vehicle, the controller being configured to communicate with the prime mover and the absolute pressure sensor,
- determining a power output of the prime mover,
- adjusting, by the controller, a power output upper limit for the prime mover based on the determined altitude,
- comparing the power output of the prime mover and the adjusted power output upper limit,
- operating, by the controller, the prime mover of the transport power system so as not to exceed the adjusted power output upper limit.

9. The method according to claim 8, further comprising:
- comparing the determined altitude with an altitude threshold,
- increasing the power output upper limit for the prime mover when the determined altitude is less than the altitude threshold.

10. The method according to claim 8, further comprising:
- determining a backpressure of a diesel particulate filter (DPF) based on the first absolute pressure and a second absolute pressure sensed by the absolute pressure sensor when the prime mover of the transport power system is running, the DPF being disposed in an exhaust system of the transport power system.

11. The method according to claim 10, further comprising:
- comparing the determined backpressure of the DPF with a backpressure upper limit,
- controlling a regeneration of the DPF when the determined backpressure of the DPF reaches the backpressure upper limit.

12. The method according to claim 10, further comprising:
- adjusting a backpressure upper limit for the DPF based on the determined altitude.

13. The method according to claim 12, further comprising:
- controlling a regeneration of the DPF when the determined backpressure of the DPF reaches the adjusted backpressure upper limit.

14. The method according to claim 8, wherein the prime mover is a diesel engine.

15. The transport power system according to claim 1, wherein the absolute pressure sensor is a single pressure sensor.

16. The method according to claim 8, wherein the absolute pressure sensor is a single pressure sensor.

* * * * *